United States Patent
Tadmor et al.

[11] Patent Number: 5,998,957
[45] Date of Patent: Dec. 7, 1999

[54] DISSIPATIVITY-BASED CONTROLLER FOR SYNCHRONOUS ELECTRIC DRIVES, AND ASSOCIATED METHODS

[75] Inventors: Gilead Tadmor, Newton; Aleksandar M. Stankovic, Cambridge, both of Mass.

[73] Assignee: SatCon Technology Corporation, Cambridge, Mass.

[21] Appl. No.: 09/067,211

[22] Filed: Apr. 28, 1998

Related U.S. Application Data

[60] Provisional application No. 60/044,352, Apr. 29, 1997.

[51] Int. Cl.[6] .................................................... H02P 5/05
[52] U.S. Cl. ............................ 318/701; 318/254; 388/904; 388/906
[58] Field of Search .................................... 318/138, 254, 318/439, 700, 701, 705, 720, 721, 722, 723, 724; 388/904, 906

[56] References Cited

U.S. PATENT DOCUMENTS

| | | | |
|---|---|---|---|
| 4,361,791 | 11/1982 | Plunkett | 318/723 |
| 4,544,873 | 10/1985 | Salihi et al. | 318/801 |
| 4,884,016 | 11/1989 | Aiello | 318/685 |
| 5,420,492 | 5/1995 | Sood et al. | 318/809 |

*Primary Examiner*—Bentsu Ro
*Attorney, Agent, or Firm*—Duft, Graziano & Forest, PC; Curtis A. Vock, Esq.

[57] ABSTRACT

The invention provides a controller for specifying a drive voltage for synchronous motors relative to a desired speed profile. The controller senses motor current and optionally senses motor rotational position. A motor torque reference is first determined to balance (a) an estimated motor load torque, (b) the reference speed profile, and (c) a filtered incremental friction. A reference torque is then determined for the operating speed, and a reference current is determined to produce the reference torque. A primary voltage module then determines a primary voltage as a function of the calculated motor torque and the reference motor current to create a reference current at the operating speed. An incremental voltage module determines an incremental voltage based on an incremental resistance and an incremental back EMF of the motor. The primary and incremental voltages are then summed specify the applied voltage to drive the motor to the reference speed profile. The speed profile can be stored, manually input to the controller, or it can be injected in real time into the control system. The controller also provides for adaptive control and for Sensorless control.

17 Claims, 5 Drawing Sheets

DISSIPATIVITY-BASED CONTROLLER FOR SYNCHRONOUS ELECTRIC DRIVES, AND ASSOCIATED METHODS

RELATED APPLICATIONS

This application is a continuation of copending Provisional Application Ser. No. 60/044,352, which was filed on Apr. 29, 1997 and which is herein incorporated by reference.

GOVERNMENT LICENSE RIGHTS

The U.S. Government has certain rights in this invention and the right in limited circumstances to require the patent owner to license others on reasonable terms, as provided for by the terms of Grant N00014-95-1-0723 awarded by the Office of Naval Research.

BACKGROUND OF THE INVENTION

It is well known that a synchronous electric motor converts AC electrical energy into synchronous rotational mechanical energy, i.e., shaft torque and rotation. Motor operation is based upon the motor effect, where a current carrying conductor experiences a force in a magnetic field. Control of such motors can be governed by motor controllers.

Figure 2:
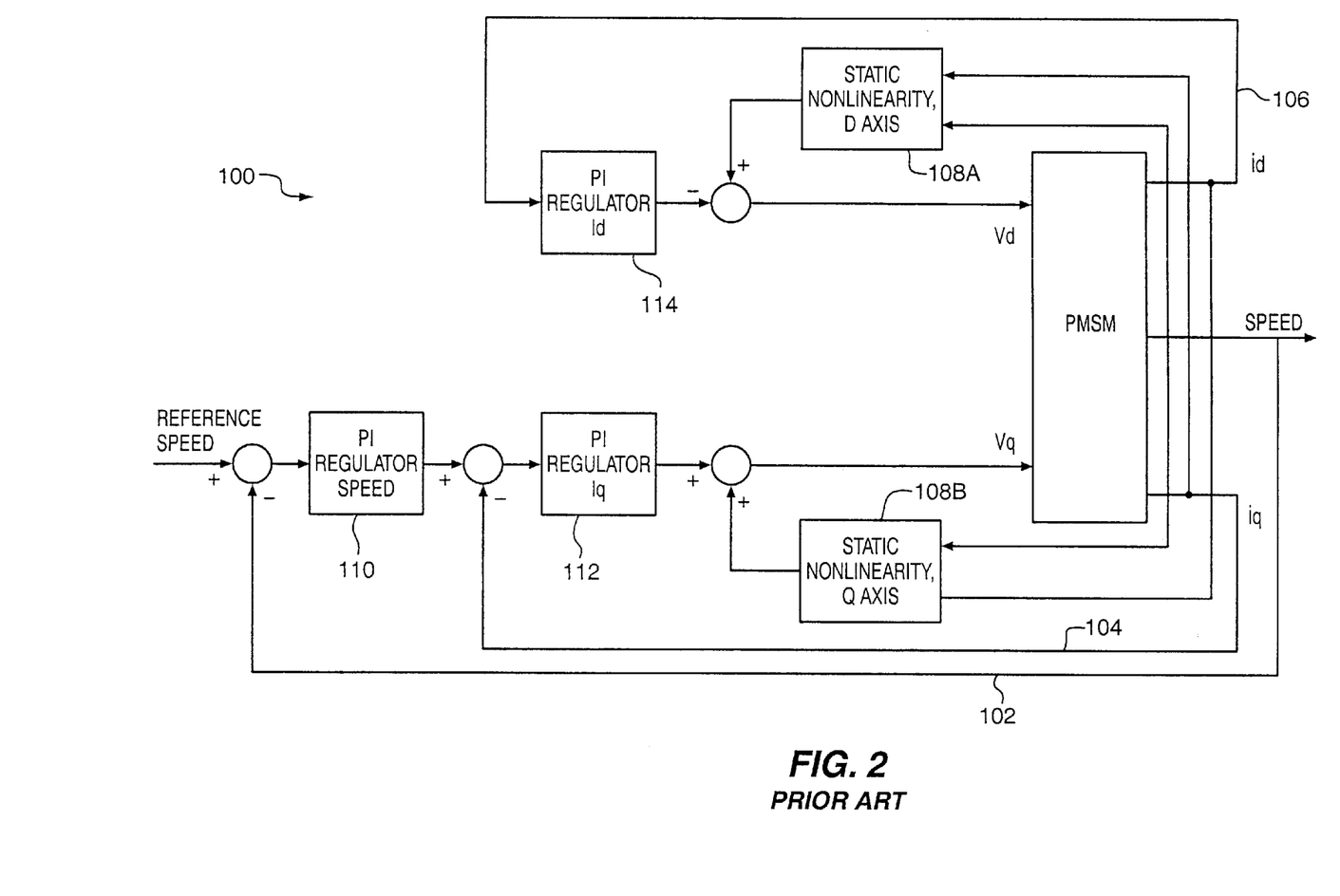
FIG. 2 shows a prior art PID controller.

The motor controllers of the prior art include proportional-integral (PI) controllers such as illustrated in FIG. 2. Specifically, FIG. 2 depicts a standard, nested loop proportional-integral (PI) vector controller 100 of a PMSM. The outer speed loop 102 provides a reference for desired motor torque, immediately translated to the level of $i_q$ that would produce that torque. Two inner current loops 104, 106 are used to control the respective "d" and "q" current components. They each include a nonlinear feedback that removes the nonlinear back EMF of the static nonlinearity subsystem 108a, 108b, and thus decouple the two current components. PI compensators 110, 112, 114 are then used to drive $i_q$ to zero and $i_q$ to its reference value.

It is often desirable for the motor to change its speed in accord with a preselected speed profile. However, the controllers of the prior art—such as the controller 100 of FIG. 2—generally require that the current convergence rates of the controller are faster than the desired convergence rate of the motor speed reference. This often requires gain adjustments for operation over a wide range of speeds and torques.

It is, accordingly, an object of the invention to provide a dissipativity-based, non-linear motor controller which processes and sets primary and incremental drive voltages for synchronous motor drives.

Other objects will become apparent in the description which follows.

SUMMARY OF THE INVENTION

In one aspect, the invention provides a motor controller for a synchronous electric drive or motor. To obtain a selected speed profile, over time, the controller specifies an input voltage which drives the motor to efficiently achieve transients corresponding to the speed profile. The controller thus includes internal memory to store the user inputs or profile, and a processor which processes parameters which, in turn, set the input voltage. In one aspect, the speed profile can be represented by a reference data speed $\omega_d$ and/or derivatives indicative of velocity and acceleration, $\dot\omega_d$ and $\ddot\omega_d$ respectively.

The motor controller of one aspect has two processing stages: a first stage which processes and determines a primary (or "desired") voltage, $v_{dq,d}$, and a second stage which processes and determines an incremental (or "error") voltage, $v_{dq,e}$. The sum of the desired and incremental voltages corresponds to the total input voltage for the motor. Those skilled in the art should appreciate that the "d" and "q" subscripts in $v_{dq,d}$ and $v_{dq,e}$ denote standard axes for rotor frame models of synchronous drives, while the added "d" subscript stands for "desired" and "e" stands for an "incremental" error-correcting term (typically, a deviation from a desired value).

The controller of another aspect includes an input section which provides access for specifying user-defined motor trajectories. A user can thus specify a desired speed profile, over time, through the input section such that the controller specifies voltages which drive the motor to the speed profile transients. The controller utilizes incremental system processing to assess the motor's energy function, over time, so as to minimize the differences between the actual motor speed and the desired motor speed in an optimum time period. Specifically, an incremental energy function is reduced by the greatest possible amount so that the differences are reduced quickly.

Accordingly, at steady state—that condition which does not require a rotational speed transient—$v_{dq,e}$ is substantially zero volts; and $v_{dq,d}$ defines the voltage required to maintain the current motor speed. When the motor is commanded via user or programmable inputs to change speed, the controller of the invention selects the parameters outlined below to achieve the desired transients. In one aspect, these parameter selections involve non-linear processing of certain equations and the selection of certain constants as defined herein. The selection of the parameters is made in an orderly and systematic way. These parameters—from an energy flow standpoint—deal with incremental dissipation to reduce the drive error between actual motor speed and desired motor speed as well as with lossless energy exchanges. Incremental dissipation can be determined from the motor currents.

In a preferred aspect, the controller includes a motor sense section which interfaces with the motor so as to indicate the operating current of the motor. In another aspect, the motor sense section further interfaces with the motor to provide a position measurement (i.e., an angular position) of the motor shaft.

In still another aspect, the controller of the invention specifies the drive voltage based upon the following parameters: (a) the incremental resistance of the motor and (b) the values which shape the lossless links between various incremental states of the motor. The items (a) and (b) are described in more detail below. Specifically, the controller specifies a drive voltage that orderly balances between the two so as to optimally achieve the desired motor transients.

In yet another aspect, the invention provides methodology for specifying the drive voltage. There are three parts to the methodology: determine a primary voltage, determine an incremental voltage, and determine a total input voltage as the addition of the primary and incremental voltages. In the first part, a motor torque reference is calculated to balance the estimated motor load torque, the reference speed profile, and an added quantity that serves as filtered incremental friction. The motor current is then calculated to produce the reference torque at the actual speed. The primary voltage $v_{dq,d}$ is then calculated, as a function of the calculated motor torque and the motor currents to create a reference current at the actual speed. In the second part, the incremental voltage $v_{dq,e}$ is calculated to add incremental resistance and incremental back EMF. The second part can include the optional step of removing the interaction between the "d" and "q" incremental flux. The incremental flux corresponds to current errors multiplied with inductance. Finally, in part three, the total drive voltage $v_{dq}$ is calculated as the sum of $v_{dq,d}$ and $v_{dq,e}$.

In one aspect, the first part of the methodology is performed by a primary controller; and the second part is performed by an incremental controller.

In another aspect, the first part of the methodology includes calculating motor torque in the form of $$\tau_{M,d} = H\dot{\omega}_d + B\omega_d + \hat{\tau}_L + \mu e_4.$$

In another aspect, the first part includes calculating motor current in the form of $$i_{dq,d} = \begin{bmatrix} i_{d,d} \\ i_{q,d} \end{bmatrix} = \frac{\tau_{M,d}}{MI} \begin{bmatrix} 0 \\ 1 \end{bmatrix}$$

if the motor is a permanent magnet synchronous motor (PMSM), or $$i_{dq,d} = 2\frac{\sqrt{\tau_{M,d}}}{\sqrt{3P\Delta L}} \begin{bmatrix} 1 \\ 1 \end{bmatrix}$$

if the motor is a SynSYM, synchronous reluctance motor (P being the number of pole pairs, and ΔL being the difference of inductances in the d and q axes).

In another aspect, the first part includes calculating primary voltage in the form of $$v_{dq,d} = L\frac{d}{dt}i_{dq,d} + (RI_2 + \omega JL)i_{dq,d} + \omega MI\begin{bmatrix} 0 \\ 1 \end{bmatrix}$$

for permanent magnet synchronous motors, or $$v_{dq,d} = L\frac{d}{dt}i_{dq,d} + (RI_2 + \omega JL)i_{dq,d}$$

for SynRM (synchronous reluctance motors).

In another aspect, the estimated load torque of the first part of the methodology takes the form of $$\frac{d}{dt}\hat{\tau}_L = -v^2 e_3$$

where $e_3 = H(\omega - \omega_d)$ represents the incremental speed, with initial values of torque $\tau_L$ set to an appropriate value, e.g., "0" or as selected from a priori information, if known.

In another aspect, $e_4$ is a filtered incremental friction, calculated as d/dt $e_4 = -\sigma e_4 - \mu e_3$.

In yet another aspect, $e_5$ corresponds to a load torque estimation error. Those skilled in the art should appreciate that different annotations can be used; for example, in the appendix attached hereto, $e_5$ can correspond to $e_4$ as discussed below.

In still another aspect, the second part of the methodology can include an optional calculation of removing interferences d and q incremental flux; and the optional calculation can take the form of ωJ multiplying the incremental fluxes, to remove the links between the d and q fluxes, where J is a two by two matrix with 0, −1 in the first row and 1, 0 in the second.

In one aspect, the filtered incremental friction takes the form of $\mu e_4$ where $\mu$ corresponds to an input control and where e corresponds to a dynamic variable. For example, $e_3$ can correspond to the difference between the actual motor speed and the reference speed; and $\mu e_4$ can represent a first order filtering of $e_3$. $\mu e_4$, as an input control, stabilizes the origin in the system which governs incremental state dynamics.

In still another aspect, the incremental back EMF takes the form of $\kappa\xi$, which is determined from the measured and reference currents and the measured and reference speeds.

In yet another aspect, the incremental flux is determined from the calculated motor current produced as a reference torque at the actual speed, and from the measured currents.

In another aspect, the incremental resistance is determined from the calculated motor current produced as a reference torque at the actual speed, and from the measured currents.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF THE EMBODIMENTS

The invention of the preferred embodiment includes a motor controller with dissipativity-based control processing to manage the variable speed and torque operations of synchronous electric motor drives. Optionally, the controller includes parameter adaptation and operation without position measurements. The invention of this embodiment utilizes a dissipative system which obtains motor stability in a desired asymptotic behavior by use of control to dissipate an incremental energy storage (Lyapunov) function, where the incremental energy of the desired trajectory is zero.

In the context of electromechanical (motor drive) systems, physically motivated incremental energy functions are naturally defined. Prior art algorithms are based on principles such as (a) an interconnection of two dissipative systems is stable, (b) voltage inputs are applied to shape the incremental system as an interconnection of a passive mechanical subsystem and a dissipative electrical subsystem, and (c) voltage inputs are used to enhance the rate of dissipation in the incremental electrical subsystem, thus directly influencing the rate of current convergence to desired levels. See, Ortega et al., *Passivity-based Control of a Class of Blodel-park Transformable Electric Machines*, IEEE Transactions on Automatic Control, TAC-42:629–647 (1997), which is herein incorporated by reference. Convergence of mechanical variables such as speed and torque is thereby indirectly obtained as a consequence of the stability of the interconnected system.

Unlike the prior art, the motor controller of the invention incorporates processing controllers which add lossless interconnections and which explicitly manipulate the rates of lossless interconnections between the electrical and the mechanical incremental subsystems, and within each of the two subsystems. Since active dissipation is enforced only on currents (by use of voltage inputs), the coordinated manipulation of both the rate of lossless incremental energy flow from the mechanical to the electrical subsystem, and of dissipation in the latter, enables direct manipulation of speed and torque convergence rates, key issues in many motor applications.

The invention has certain advantages. For example, it removes the typical constraint of prior art motor controllers (including dissipativity-based and traditional, nested loop proportional-integral (PI) controllers) as to the necessity of short time constants in the closed loop electrical subsystem as compared with the desired time constants for mechanical response. Slowing the required electrical subsystem response to be close to (or even equal to) that of the mechanical subsystem means that a less capable power supply and a slower sampling rate in the digital controller are needed. A slower electrical response also means—in linear systems terminology—a narrower compensator bandwidth, and, in turn, a better attenuation of high frequency disturbances and of the effects of unmodeled higher harmonic components in the electromotive force (EMF). Consequently motor torque and speed responses in accord with the invention are likely to be smoother than prior art motor systems. In addition, an explicit and direct manipulation of convergence rates as a function of design parameters reduces the trial-and-error aspect of motor design.

The processing functions of a controller of the invention preferably include various observers. Dynamic estimation of the load torque and control adaptation are thus preferred features of the controller for variable speed and variable torque applications. Added capabilities can include dynamic estimation and adaptation of other motor and load parameters that are either initially unknown (e.g., inductance coefficient in a self-commissioning stage) and that may change during operation (e.g. resistance or load inertia). Alternatively, dynamic position estimates can replace position sensors to reduce the overall cost and size of the motor drive, improving its overall physical integrity. In control variants that include dynamic estimation and adaptation, the incremental energy can further include the "energy" of estimation errors. Lossless exchanges are then established between dynamic estimation variables and the electrical subsystem, and their rates are directly manipulated.

By way of background, the invention primarily concerns the control of permanent magnet synchronous motors (PMSM) and synchronous reluctance motors (SynRM). Those skilled in the art should appreciate the distinction between the two motors as well as the operation of such motors. Further background can be found with reference to the following references, each of which is incorporated herein by reference: Leonhard, *Control of Electric Drives*, Springer-Verlag, New York (1985); Nasar et al., *Permanent Magnet, Reluctance and Self-Synchronous Motors*, CRC Press (1993); Seely, *Electromechanical Energy Conversion*, McGraw-Hill (1962); Taylor, *Non-linear Control of Electric Machines: An Overview*, IEEE Control Systems, 14:41–51 (1994).

In the discussions below, $\lambda$, i, and v notationally stand for the flux, current and voltage vectors, respectively. Further, the discussions herein often relate to the following standard coordinate systems as known in the art: 1) the two phase stator coordinate frame, known as the $\alpha\beta$ coordinates, and 2) the rotor frame, known as the dq coordinates. The two are distinguished by respective subscripts. The relations between the two coordinate representations is made via a position dependent unitary transformation $$\lambda_{dq}=e^{-J\theta}\lambda_{\alpha\beta},\ i_{dq}=e^{-J\theta}i_{\alpha\beta},\ v_{dq}=e^{-J\theta}v_{\alpha\beta} \tag{1}$$

where $\theta$ stands for the rotor angular displacement and J is the 2×2 matrix $$J = \begin{bmatrix} 0 & -1 \\ 1 & 0 \end{bmatrix}. \tag{1.1}$$

In the SynRM, flux is generated solely by stator winding currents $$\lambda_{dq}=Li_{dq},\ \lambda_{\alpha\beta}=e^{J\theta}Le^{-J\theta}i_{\alpha\beta} \tag{2}$$

where L is the 2×2 matrix $$L = \begin{bmatrix} L_d & 0 \\ 0 & L_q \end{bmatrix}, \tag{2.1}$$

as defined by inductance coefficients $L_d$ and $L_q$ (note, again, that the "d" and "q" coefficients correspond to the rotor frame model). In the PMSM, flux also includes a component, of magnitude, MI, due to the rotor permanent magnet:

$$\lambda_{\alpha\beta} = e^{J\theta}\left(Le^{-J\theta}i_{\alpha\beta} + MI\begin{bmatrix} 0 \\ 1 \end{bmatrix}\right). \tag{3}$$

Those skilled in the art should appreciate that more elaborate functions, compared to equations (2) and (3), can be generated to include higher harmonic components in the flux position dependence, reflecting structural noidealities, and/or to account for magnetic saturation.

The electric component model of both PMSM and SynSYM motors takes the following form:

$$\frac{d}{dt}\lambda_{\alpha\beta} = -Ri_{\alpha\beta} + v_{\alpha\beta}. \tag{4}$$

In the dq coordinate framework, the SynRM model is $$L\frac{d}{dt}i_{dq} = -(RI_2 + \omega JL)i_{dq} + v_{dq} \tag{5}$$

and the PMSM model has an added term of back EMF due to the permanent magnet flux, i.e., $$L\frac{d}{dt}i_{dq} = -(RI_2 + \omega JL)i_{dq} - \omega MI\begin{bmatrix} 0 \\ 1 \end{bmatrix} + v_{dq} \tag{6}$$

Except for shaft sensorless operation (discussed below), the following processing algorithms are detailed in the dq framework. More particularly, due to the lack of position measurement, the measured/known quantities $i_{\alpha\beta}$ and $v_{\alpha\beta}$ cannot be accurately translated to the dq coordinates without measurement of $\theta$. In that case, the design is detailed in the stator $\alpha\beta$ coordinates.

The mechanical component of the motor is governed by Newton's equation $$H\frac{d}{dt}\omega = \tau_M - B\omega - \tau_L \quad (7)$$

where H is the rotor's moment of inertia, $\omega$ is the rotor's angular speed, B is the rotational friction coefficient, $\tau_M$ is the torque produced by the motor, and $\tau_L$ is the load torque. The expression for the torque in the SynRM can be represented by $$\tau_M = \frac{3P}{4}i_{\alpha\beta}J\lambda_{\alpha\beta} = \frac{3P}{4}i_{dq}J\lambda_{dq} = \frac{3P\Delta L}{4}i_d i_q \quad (8)$$

where P is the number of rotor poles and $\Delta L = L_d - L_q$. In particular, a key inequality to torque production is represented by $L_d \gg L_q$. The expression for the produced torque in the PMSM is then $$\tau_M = (MI + \Delta L i_d)i_q \quad (9)$$

in motors with a salient rotor. In motors with a non-salient rotor, $\Delta L = 0$.

Motor operation is based on the near-lossless energy transfer between the electrical subsystem to the mechanical subsystem. Dissipation losses included ohmic losses due to electric resistance and mechanical losses due to friction.

Systems derived from dynamics of energy conversions can be written in the simplified Lagrangian form $$\frac{d}{dt}x = -(D + S(x))x \quad (10)$$

where x is the state vector, D is a positive semi-definite diagonal matrix, and where the nonlinear matrix function $S(x)$ takes skew-symmetric values, so that $S(x) + S(x)^T = 0$. In such models, the storage function $V = 0.5 x^T x$ represents the energy stored in the state at any given time. The derivative of the storage function V along trajectories of Equation (10) is non-negative, indicating energy dissipation $$\frac{d}{dt}V = -x^T D x \quad (11)$$

In view of Lyapunov analyses, if the null space of D is not invariant under the dynamics of Equation (10), then Equation (11) implies stability in the sense that the state tends to asymptotically approach zero. A stronger, uniform exponential stability property can also exist: along each state trajectory, Equation (10) is interpreted as a linear time varying (LTV) system $$\frac{d}{dt}x(t) = A(t)x(t) \quad (11.1)$$

with $A(t) = -(D + S(x(t)))$. In these notations, if the pair [A,D] is observable, uniformly over all time intervals of a fixed length, and for all possible trajectories of Equation (10), then Equation (11) provides uniform exponential stability. Following from Equation (11), elements of the matrix D represent dissipation coefficients and their increase therefore results in increased dissipation rates. The absence of matrix $S(x)$ from Equation (11) indicates that it governs the lossless component of the state dynamics relative to the energy storage function $V(x)$.

Those skilled in the art should appreciate that the above analyses apply to synchronous motors, with the state $$x = \left[\sqrt{L_d}\, i_d, \sqrt{L_q}\, i_q, \sqrt{H}\, \omega\right]^T. \quad (11.2)$$

Indeed, the diagonal matrix is then built of the weighted resistance and friction coefficients $$D = \left(\frac{R}{L_d}, \frac{R}{L_q}, \frac{R}{H}\right). \quad (11.3)$$

The rate of loss-less exchanges—and the matrix $S(x)$—is then determined by the inductance coefficients, which is expected for a system created to transform electrical energy into mechanical energy.

In the process of control design, the state of x is not overly important; but rather the focus is in the dynamics of an incremental state that represents deviations from desired values.

In view of the nonlinear control of the invention, the controller is generally partitioned into two components: a "primary" controller and a "secondary" (or "incremental") controller. The primary controller translates the reference command and available measurements into "desired" state values, denoted by "$x_d$" (the subscript "d" stands for "desired" and should not be confused with the "d" coordinates of the flux, current and voltage vectors; thus, e.g. $i_{d,d}$ and $i_{q,d}$ are the "desired" values of $i_d$ and $i_q$). "Desired" control inputs, denoted "$u_d$", are selected to balance the state equation at the desired state. An incremental state, $e = x - x_d$, represents deviations from the desired state values.

The "secondary" controller selects an "incremental" control "$u_e$" to drive the incremental state to zero. In other words, the secondary controller stabilizes the origin in the system that governs incremental state dynamics. In these terms, the overall control input is $u = u_d + u_e$.

In the incremental system, loss-less interconnection of a strictly dissipative system (i.e., with a positive definite "D" matrix) and a passive system (i.e., with a positive semi-definite "D" matrix), is stable. Furthermore, decay rates can be increased if the rate of dissipation in the strictly dissipative system is increased. In the case of an electric drive, the natural partition is between mechanical and electrical components of the incremental system. There is no direct mechanical actuation; but the homogeneous part of the incremental mechanical system is dissipative, due to friction. Voltage actuation is used for two purposes: (a) using the notation of Equation (10) in reference to the incremental system, voltage feedback is used to complement off-diagonal elements in the combined incremental system model to a skew symmetric "S", meaning that the interconnection of the incremental mechanical and electrical subsystems is lossless, and (b) voltage actuation is used to add an "incremental resistance", reflected by an increase in the first two diagonal entries in the overall matrix "D" of Equation (10) to increase incremental current dissipation.

Using the notation of Equation (10), an increase in elements of "D" may improve dissipation. Further, despite the fact that S does not contribute directly to energy dissipation, an addition of elements to S (while maintaining the skew symmetric structure) and an increase in existing elements can increase the overall state dissipation rate, a consequence of increasing the rate of lossless energy transfer between states with low dissipation rates (corresponding to small or zero entries in D that cannot be increased by control, such as friction) and states with high dissipation rates. Even larger values of elements of S may create oscillatory state behavior when the rate of internal lossless energy dynamics exceeds the rate of energy dissipation.

In a first example, consider a second order linear time invariant (LTI) system $$\frac{d}{dt}x = \begin{bmatrix} -2a & b \\ -1 & 0 \end{bmatrix} x \quad (11.4)$$

The fact that elements of the first row of Equation (11.4) are left as variables means that they can be manipulated, e.g., by feedback control, when direct actuation of the first state is possible. A "passivity based" control algorithm will complement the predetermined off-diagonal element in the (2,1) position to a skew-symmetric matrix by setting b=1. The value of the design parameter "a" may be increased depending on available actuation. Computing eigenvalues—which the LTI framework allows—reveals that the shortest possible time constant is then τ=1, achieved with a=1. Further increase in "a" will actually deteriorate the overall dissipation rate.

In accord with the invention, the preferred embodiment begins with a manipulation of loss-less channels. To do so we change basis by $$\tilde{x} = \begin{bmatrix} 1 & 0 \\ 0 & \sqrt{b} \end{bmatrix} x, \quad (11.5)$$

which is possible with b>0, bringing the system to a "dissipative+skew symmetric" form $$\frac{d}{dt}\tilde{x} = \begin{bmatrix} -2a & \sqrt{b} \\ -\sqrt{b} & 0 \end{bmatrix} \tilde{x} \quad (11.6)$$

Selecting b=a√(1+ζ²), with ζ≧0, eigenvalues occur at −a(1±jζ), showing that the selection of both a and b allows a free assignment of the system time constant, providing a compromise between an increasing oscillatory behavior (as ζ increases) and a swifter initial response.

An explanation in terms of energy flow that transcends the linear algebraic context and that applies to nonlinear systems of the general form of Equation (10), is that an increase in elements of the matrix S, represented here by the parameter "b", reflects intensification of loss-less exchanges between states. In particular, it can be used as a conduit for faster overall dissipation. A fixed structure of S, represented by b=1, limits the rate of loss-less exchanges and, thereby, the achievable decay rate.

In a second example, the second order system described above is embedded into the following third order structure $$\frac{d}{dt}x = \begin{bmatrix} -2a & b & 0 \\ -1 & 0 & -1 \\ 0 & c & -100 \end{bmatrix} x \quad (11.7)$$

With c=0, this system can be viewed as a cascade of two dissipative systems: a first order system with the time constant of τ=0.01, followed by the system from the previous example. The selection of c>0 (followed by an appropriates state scaling, as above) adds a loss-less channel that can be used to funnel some of the excess energy from the second state to the fast decaying third, instead of solely to the first.

This provides certain motivations. When c does not equal 0, any time constant larger than τ=0.01 is obtained with lower values of some coefficients. When c=0, the time constant τ=0.02 requires that a=50 and that b=2500. The same time constant is achieved with a=25, b=0 and C=2500. This may translate to lower gains in the control action. It may also mean utilizing bandwidth of available analog system components, represented in the example by the third state (e.g., the stator winding), instead of adding wide-band dynamic components to the compensator which is susceptible to sensor noise amplification, etc.

Explicit computations of eigenvalues which were possible in the LTI context of the examples above may be impossible when dealing with non-linear components of systems of the form of Equation (10). However, as passivity-based design is intended for incremental control, and as the steady state range may be known a priori, one may use eigenvalue analysis of "−(D+S(x))" near anticipated steady states as a practical guidance for design.

PRIMARY CONTROLLER

The following describes the primary controller in the preferred embodiment of the invention for the case where the reference command includes the desired speed value $\omega_d$, along with the first two time derivatives, $\dot{\omega}_d$, and $\ddot{\omega}_d$, of the desired speed trajectory. Alternatives are also possible such as where $\omega_d$ is specified but where it is also known that $\omega_d$ is slowly varying. In such a case, the values $\dot{\omega}_d=0$ and $\ddot{\omega}_d=0$ will be used and the actual values of these derivatives are treated as small unknown disturbances that appear as inhomogeneous terms in the incremental system.

Denoting $e_3 = H(\omega - \omega_d)$, the controller of the invention includes a dynamic load torque $$\frac{d}{dt}\hat{\tau}_L = -\nu^2 e_3 \quad (12)$$

An initial value for $\tau_L$ is selected based on a priori information, if available, or else the initial load torque estimate is set to zero. A second dynamic variable denoted as $e_4$ is initiated at $e_4(0)=0$, and governed by the differential equation $$\frac{d}{dt}e_4 = -\sigma e_4 - \mu e_3 \quad (13)$$

The parameters σ, μ and ν are selected so that all three eigenvalues of the 3×3 matrix $A_{2,2}$, below, are situated at a designated negative value −ρ. The value of −ρ is the designated exponential convergence rate of the motor speed to the reference speed when both the reference speed and the (unknown) load torque are constants. The only limitation on the selection of ρ is due to the available power supply, as discussed below.

$$A_{2,2} = \begin{bmatrix} -\frac{B}{H} & \mu & \nu \\ -\mu & -\sigma & 0 \\ -\nu & 0 & 0 \end{bmatrix} \quad (14)$$

The desired value of the generated motor torque is based on the torque that is needed to balance Equation (7) at the desired speed and the estimated load torque, with the added transient $\mu e_4$ in accord with the following relationship:

$$\tau_{M,d} = H\dot{\omega}_d + B\omega_d + \hat{\tau}_L + \mu e_4 \quad (15)$$

The desired current levels are selected to produce $\tau_{M,d}$ as the motor torque. An available degree of freedom allows, for example, a maximum torque per ampere determination. In the case of a PMSM with $L_d=L_q$ (hence $\Delta L=0$), this amounts to $$i_{dq,d} = \begin{bmatrix} i_{d,d} \\ i_{q,d} \end{bmatrix} = \frac{\tau_{M,d}}{MI}\begin{bmatrix} 0 \\ 1 \end{bmatrix} \tag{16}$$

An equation determining the optimal desired current when $\Delta L$ does not equal zero is provided in the appendix hereto. It is more complex and harder to implement than Equation (16); though as long as $\Delta L$ is small, Equation (16) can be used without a significant increase in steady state currents (and ohmic losses).

In a SynRM, the optimal desired current selection can be represented by:

$$i_{dq,d} = 2\frac{\sqrt{\tau_{M,d}}}{\sqrt{3P\Delta L}}\begin{bmatrix} 1 \\ 1 \end{bmatrix} \tag{17}$$

In both Equations (16) and (17), expressions for derivatives of the desired current trajectories are obtained in terms of the reference data ($\omega_d$, $\dot{\omega}_d$ and/or $\ddot{\omega}_d$), the measured speed $\omega$ and the computed dynamic variables $\tau_L$ and $e_4$. The input voltage values that are determined by the primary controller are those that balance Equation (4) at the desired currents and at the measured speed. In the case of the PMSM, this translates to $$v_{dq,d} = L\frac{d}{dt}i_{dq,d} + (RI_2 + \omega JL)i_{dq,d} + \omega MI\begin{bmatrix} 0 \\ 1 \end{bmatrix} \tag{18}$$

In the case of the SynRM, the nominal, "desired" voltage is $$v_{dq,d} = L\frac{d}{dt}i_{dq,d} + (RI_2 + \omega JL)i_{dq,d} \tag{19}$$

Denoting $e_1=L_d(i_d-i_{d,d})$, $e_2=L_q(i_q-i_{q,d})$, $e_5=1/\nu(\hat{\tau}_L-\tau_L)$, and letting the definitions of $e_3$ and $e_4$ stand, the incremental control is determined by a selection of a positive parameter $\kappa$, as $$v_{dq,e} = (-\rho + RL^{-1} + \omega J)\begin{bmatrix} e_1 \\ e_2 \end{bmatrix} - \kappa^2\xi e_3 \tag{20}$$

where, in the PMSM design $$\xi = L^{-1}\left((\Delta L)\begin{bmatrix} i_q \\ i_{d,d} \end{bmatrix} + MI\begin{bmatrix} 0 \\ 1 \end{bmatrix}\right) \tag{21}$$

and in the SynRM design $$\xi = \frac{3P\Delta L}{4}L^{-1}\begin{bmatrix} i_q \\ i_{d,d} \end{bmatrix} \tag{22}$$

The total input voltage in both cases is $$v_{dq} = v_{dq,d} + v_{dq,e} \tag{22.1}$$

The guidelines for the selection of $\rho$ and $\kappa$ are based on analyses of incremental state dynamics. In closed loop, the combined incremental state e is governed by $$\frac{d}{dt}e = \begin{bmatrix} -\rho I_{2\times2} & -\kappa^2 A_{2,1}^T \\ A_{2,1} & A_{2,2} \end{bmatrix}e - \frac{1}{\nu}\begin{bmatrix} 0 \\ 0 \\ 0 \\ 0 \\ 1 \end{bmatrix}\frac{d}{dt}\tau_L \tag{23}$$

where $$A_{2,1} = \begin{bmatrix} \xi^T \\ 0_{2\times2} \end{bmatrix} \tag{24}$$

Setting $\tilde{e}_i = e_i$, $i=1,2$, and $\tilde{e}_i = \kappa\, e_i$, $i=3,4,5$, Equation (23) becomes:

$$\frac{d}{dt}\tilde{e} = \begin{bmatrix} -\rho I_{2\times2} & -\kappa A_{2,1}^T \\ \kappa A_{2,1} & A_{2,2} \end{bmatrix}\tilde{e} - \frac{\kappa}{\nu}\begin{bmatrix} 0 \\ 0 \\ 0 \\ 0 \\ 1 \end{bmatrix}\frac{d}{dt}\tau_L \tag{25}$$

Accordingly, the homogeneous part is of the form of Equation (10), and stability is established. The selection of $\rho$ determines the decay rate of the main diagonal blocks $-\rho I_{2\times2}$; and $A_{2,2}$ is determined by the selection of $\mu$, $\nu$ and $\sigma$. Simulation that includes magnitude and rate limitations of the available power supply determines the decay rate that is feasible under expected operation conditions. This decay rate is guaranteed, in principle, if $\kappa=0$ is selected in Equation (20), and then in Equation (23). Positive $\kappa$ assists in balancing the decay of current and speed tracking errors by creating loss-less dynamics between these incremental states. The magnitude of a desirable level of $\kappa$ is determined by analyzing the eigenvalues (particularly, their maximum possible imaginary parts) of the "A" matrix of the homogeneous part of Equation (25), where current values are at expected steady state levels.

Figure 1:
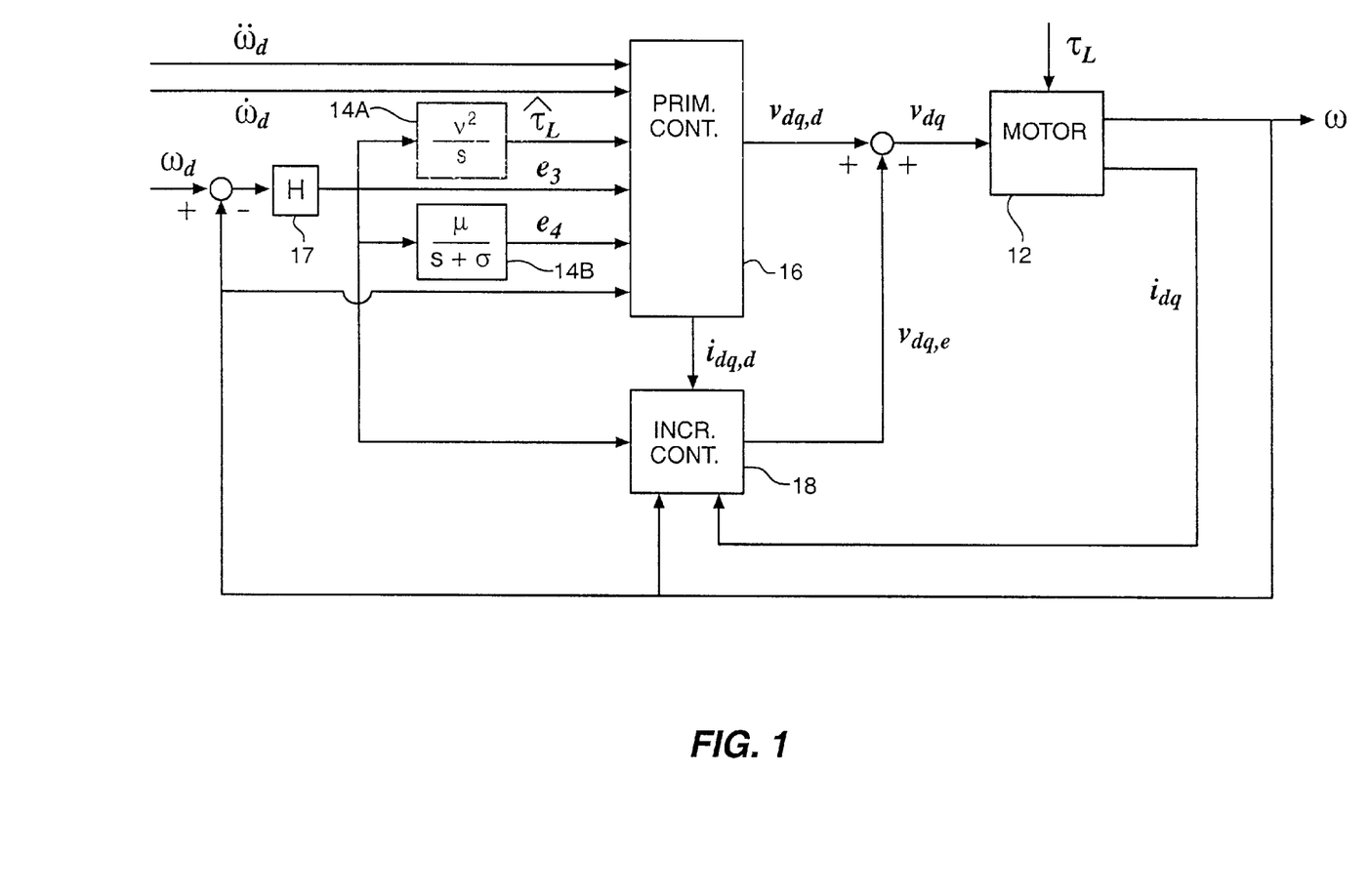
FIG. 1 schematically illustrates one motor controller of the invention in operation with a synchronous linear drive.

One controller 10 of the invention is illustrated in FIG. 1. In FIG. 1, an applied voltage $v_{dq}$ and load torque $\tau_L$ are input to the motor 12, and the speed $\omega$ and phase currents $i_{dq}$ are outputs from the motor 12. The dynamic components of the compensator 14 is shown with functional annotation $v^2/s$ in block 14a and $\mu/(s+\sigma)$ in block 14b. The primary controller 16 represents a processing module which, for example, processes through Equations (18) and (19), using the definitions in Equations (12), (13), (14), (15), (16) and (17) and the respective right hand sides of Equations (12) and (13) (for the computation of d/dt ($T_{M,d}$ and, eventually, d/dt($i_{da,d}$)). Block 17 represents thte moment of inertia H of the motor 12.

The incremental controller 18 represents a processing module which, for example, processes through Equation (20) using Equations (21) and (22).

FIG. 1 addresses the case where the reference input includes both the values of the desired speed $\omega_d$ and its first two derivatives (i.e., rotational velocity $\dot{\omega}_d$ and acceleration $\ddot{\omega}_d$). In the case of a narrow band reference speed, if derivative values are unknown, the prescribed value of zero is used instead of $\dot{\omega}_d$ and $\ddot{\omega}_d$. The resulting error acts as a small perturbation that will vanish in the case of a near-constant reference.

In summary, the two step controller of the invention is based on parameter selections that determine convergence rates of the motor to operation at the desired steady state (if the load torque is constant). Stability is assured by adhering to the dissipative and lossless form of Equation (10). Manipulation of the off-diagonal, skew-symmetric component of the "A" matrix is used to provide for equal convergence rate of all the incremental states. In particular, the controller does not require that the rate of current convergence be faster than the desired convergence rate of motor speed to the set reference. This reduces power supply requirements; and higher motor performance is then possible with available power supply. Global stability is also obtained, and there is no need for gain scheduling in various operating conditions. Load torque derivative affects the motor as a disturbance; and slow load variations translate to a small derivative that has only small effect on tracking error. A zero derivative thus results in near-perfect asymptotic tracking.

As noted earlier, if the reference does not include information on the first two derivatives of the desired speed trajectory, their values will be replaced by zero in the computation of $\tau_{M,d}$ and $i_{dq,d}$ and eventually of $v_{dq,d}$. This translates to the presence of inhomogeneous terms involving these derivatives in the first three Equations (23)–(25).

Adaptive Control with Position and Speed Measurement

The controller described above already contains adaptation to the unknown (and practically unmeasurable) load torque. When electric motor parameters, such as inductances and resistance, or mechanical parameters, such as the friction coefficient and the moment of inertia (in addition to the load torque), are not known accurately, or may change during operation, a dynamic observer that provide estimates of these quantities in the basic compensator is added. A detailed description of the design for the PMSM is provided here; and the design for the SynRM is obtain by analogy. Additional detail of adaptation control follows below.

Unknown parameters (including the load torque) are represented by a vector of values, e.g., z, with corresponding dynamic estimates $\hat{z}$ and an estimation error vector $p=\hat{z}-z$. Estimated parameters substitute their actual values in the basic control processing, as described earlier. Note that since these are dynamic estimates, the derivative of $\tau_{M,d}$, hence the expression for the primary voltage input, can include derivatives of parameter estimates (e.g. d/dt($\hat{MI}$) in the PMSM). The incremental state e now includes only $e_i, i=1, 2, 3, 4$ (since load torque estimate is included in $\hat{z}$). Ignoring drift in unknown parameters, the selection of the representation z of the motor parameters is made in a way that the dynamic equation of the closed loop incremental state can be written in the form $$\frac{d}{dt}\tilde{e} = \begin{bmatrix} -\rho I_{2\times 2} & -\kappa A_{2,1}^T \\ \kappa A_{2,1} & A_{2,2} \end{bmatrix} \tilde{e} + Mp \qquad (26)$$

Here the matrix M is a nonlinear function of the state, its structure detailed in the appendix, and $$A_{2,1} = \begin{bmatrix} \xi^T \\ 0_{1\times 2} \end{bmatrix} \qquad (27)$$

$$A_{2,2} = \begin{bmatrix} -\frac{B}{H} & \mu \\ -\mu & -\sigma \end{bmatrix}$$

Selection of $\rho$ as in the basic case and $\sigma, \mu$ are selected to set both eigenvalues of $A_{2,2}$ equal to $-\rho$. The adaptation is of the form $$\frac{d}{dt}\hat{z} = -\Gamma^2 M^T(i_{dq}, \omega, i_{dq,d}, \omega_d)^T \tilde{e} \qquad (28)$$

where $\Gamma = \text{diag}\{\gamma_1, \gamma_2, \ldots\}$ is a diagonal matrix in the design parameters $\gamma_i$.

To select $\gamma_i$, note that when unknown motor parameters are constant, then $d/dt(\hat{z})=d/dt$ (p). Scaling $\tilde{p}=\Gamma^{-1}p$, the desired structure of a dissipative and lossless system is obtained:

$$\frac{d}{dt}\begin{bmatrix} \tilde{e} \\ \tilde{p} \end{bmatrix} = \begin{bmatrix} A & M\Gamma \\ -\Gamma M^T & 0 \end{bmatrix}\begin{bmatrix} \tilde{e} \\ \tilde{p} \end{bmatrix} \qquad (29)$$

Manipulation of $\Gamma$ determines the intensity of the lossless dynamics between p and e and therefore how aggressive the adaptation is. The selection of $\Gamma$ can be determined by eigenvalue analysis of Equation (29) at nominal a priori-approximated steady-state.

The various unknown motor parameters effect the first three equations in the incremental system. Furthermore, the first two equations involve only the "electric parameters" R, $L_d$, $L_q$ and (in the PMSM) MI; whereas the third equation involves only the "mechanical parameters" H, B and $\tau_L$. Thus, if adaptation involves more than two electric parameters and/or more than a single mechanical parameter, the matrix M is singular, where the Lyapunov condition for stability of the origin is not satisfied. The consequence is that, although the value of Mp will decay to zero, the value of p might not, and only stability of the neighborhood of the origin is guaranteed, meaning that parameters may not converge to their true value. Nonetheless, the relevant states (currents and speed) will converge to the desired states (as e converge to zero), assuring global stability of these states, without gain scheduling.

Shaft Sensor-less Control

In the case where the motor operates without position and/or speed sensors (such as resolvers or encoders), as set forth in the appendix, further processing can occur. For example, in a PMSM with a non-salient rotor, where $L_d=L_q$, L can be treated as a scalar. The salient rotor PMSM and the SynRM are treated in complete analogy. As explained above, the algorithm for this case is detailed in the stator $\alpha\beta$ coordinates; but its principles remain essentially the same. The added component is a dynamic full state observer, using current estimation error in correction terms. The observer form can be represented by the following (due to the use of a different reference frame, the notion for design parameters in this section differs from the preceding ones):

$$\dot{\hat{i}}_{\alpha\beta} = -\frac{R}{L}\hat{i}_{\alpha\beta} - \frac{MI}{L}\hat{\omega}e^{j\hat{\theta}}\begin{bmatrix} 0 \\ 1 \end{bmatrix} + \frac{1}{L}v_{\alpha\beta} - \begin{bmatrix} f_1 \\ f_2 \end{bmatrix} \qquad (30)$$

$$\dot{\hat{\omega}} = \frac{MI}{H}[0\ 1]e^{-j\hat{\theta}}\hat{i}_{\alpha\beta} - \frac{B}{H}\hat{\omega} - \frac{1}{H}\hat{\tau}_L - f_3$$

$$\dot{\hat{\theta}} = \hat{\omega} - f_4$$

$$\dot{\hat{\tau}}_L = -f_5$$

with the correction term $$f = \begin{bmatrix} \left(\frac{R}{L} - \kappa - \rho\right) I_2 \\ \kappa\left(\frac{R}{L} - \kappa - \rho\right) M_{12}^{-1} - Q(M_{12}^T + M_{21}) \\ \upsilon \rho \psi^T \end{bmatrix} \Delta i_{\alpha\beta} \quad (31)$$

where the design parameters are $\kappa$, $\rho$ and $\nu$, subject to the definitions $$M_{12} = \frac{MI}{\sqrt{2}\,L} e^{j\theta} \begin{bmatrix} \omega & -\omega \\ -1 & -1 \end{bmatrix} \quad (32)$$

$$M_{21} = \left( \frac{\kappa L}{\sqrt{2}\,MI}\left(\left(\frac{R}{L} - \kappa\right)\right) I_2 + \frac{1}{2}\begin{bmatrix} \frac{B}{H}+1 & \frac{B}{H}+1 \\ \frac{B}{H}-1 & \frac{B}{H}-1 \end{bmatrix} \right)$$

$$X \begin{bmatrix} \frac{1}{\omega}-1 \\ -\frac{1}{\omega}-1 \end{bmatrix} + \frac{1}{\sqrt{2}\,H}\left(MI - \frac{\upsilon^2 L}{MIH}\right)\begin{bmatrix} 0 & 1 \\ 0 & 1 \end{bmatrix}$$

$$-\frac{\kappa L}{\sqrt{2}\,MI}\begin{bmatrix} \omega - \frac{\omega}{\omega^2}1 \\ -\omega + \frac{\omega}{\omega^2}1 \end{bmatrix} e^{-j\theta}$$

$$Q = \frac{1}{\sqrt{2}}\begin{bmatrix} 1 & 1 \\ 1 & -1 \end{bmatrix}$$

$$\psi^T = -\frac{\upsilon L}{HMI}[\,0\ \ 1\,]e^{-j\theta}$$

The primary control design uses the estimates from Equation (30), along with the following equations. The desired produced torque includes a design parameter $\mu$ $$\tau_{M,d} = H\dot{\omega}_d + B\omega_d + \hat{\tau}_L - (\mu - B)(\hat{\omega} - \omega_d) \quad (33)$$

A value of the desired $i_{dq,d}$ is then formally set, as in the basic algorithm; and it is translated to the $\alpha\beta$ coordinates, using the position estimate $\theta$ $$i_{\alpha\beta,d} = e^{J\hat{\theta}} i_{dq,d} \quad (34)$$

The time derivative of $i_{\alpha\beta,d}$ is then determined using the derivatives of position and load torque estimates from Equation (30). The primary voltage input is then set to $$\upsilon_{\alpha\beta,d} = L\frac{d}{dt}i_{\alpha\beta,d} + Ri_{\alpha\beta,d} + MI\hat{\omega}e^{j\hat{\theta}}\begin{bmatrix} 0 \\ 1 \end{bmatrix} \quad (35)$$

The incremental voltage input is set to $$\upsilon_{\alpha\beta,e} = -(\lambda - R)(i_{\alpha\beta} - i_{\alpha\beta,d}) + MIe^{j\hat{\theta}}\begin{bmatrix} 0 \\ 1 \end{bmatrix}(\omega_d - \hat{\omega}) \quad (36)$$

with the design parameter $\lambda$. Under these definitions, the proposed position observer is, in principle, only valid for a non-zero estimated speed. Various start-up algorithms are available in the literature, including those set forth in the appendix hereto. The design is based on local linearizations of the systems governing estimation and tracking errors, in the sense that only linear terms in these errors are kept. A state dependent change of coordinates in the system that governs propagation of observer errors brings it to the form $$\dot{\xi} \approx \begin{bmatrix} -\rho I_2 & M_{12} & 0_{2\times 1} \\ -M_{12}^T & M_{22} + \Delta M_{22} & M_{23} \\ 0_{1\times 2} & -M_{23}^T & 0 \end{bmatrix} \xi + \begin{bmatrix} 0 \\ 0 \\ 0 \\ 0 \\ \frac{1}{\upsilon}\dot{\tau}_L \end{bmatrix} \quad (37)$$

where $$M_{22} = -\frac{1}{2}\begin{bmatrix} 2\kappa - 1 & -1 \\ 1 & 2\kappa + 1 \end{bmatrix} \quad (38)$$

$$\Delta M_{22} = \frac{B}{2H}\begin{bmatrix} 1 & 1 \\ 1 & 1 \end{bmatrix}$$

$$M_{23} = \frac{\upsilon}{\sqrt{2}\,H}\begin{bmatrix} 1 \\ 1 \end{bmatrix}$$

$$M_{31} = \frac{\upsilon(R - \kappa L)}{HMI}[\,0\ \ 1\,]e^{-j\hat{\theta}}$$

$$M_{33} = 0$$

This system is of the form of "dissipative+lossless+small perturbation" ($\Delta M_{22}$, proportional to the friction coefficient B). The selection of $\rho$ and $\kappa$ determine the dissipative part and dominate the effect of $\Delta M_{22}$. Uniform convergence rate is obtained with $\kappa = \rho$. The selection of $\nu$ determines the lossless channel between $\xi_4$ and $\xi_5$. Selection of $\nu$ can be made by eigenvalue analysis of Equation (37) at anticipated steady state, ignoring the skew-symmetric contribution of $M_{12}$.

The system that governs the dynamics of incremental currents and speed is approximated as $$\frac{d}{dt}e \approx \begin{bmatrix} -\frac{\lambda}{L}I_2 & -MIe^{j\hat{\theta}}\begin{bmatrix} 0 \\ 1 \end{bmatrix} \\ MI[\,0\ \ 1\,]e^{j\hat{\theta}} & -\frac{\upsilon}{H} \end{bmatrix} e + \begin{bmatrix} 0 & 0 \\ MIe^{j\hat{\theta}}\begin{bmatrix} \omega \\ 0 \end{bmatrix} & 0 \\ 0 & 0 \\ 0 & \mu - B & -1 \end{bmatrix}\begin{bmatrix} \Delta\omega \\ \Delta\theta \\ \Delta\tau_L \end{bmatrix} \quad (39)$$

Dissipation rates in the homogeneous part are determined by $\lambda$ and $\mu$. Again, for a uniform convergence rate, those will be set equal to $\rho$.

Figure 3:
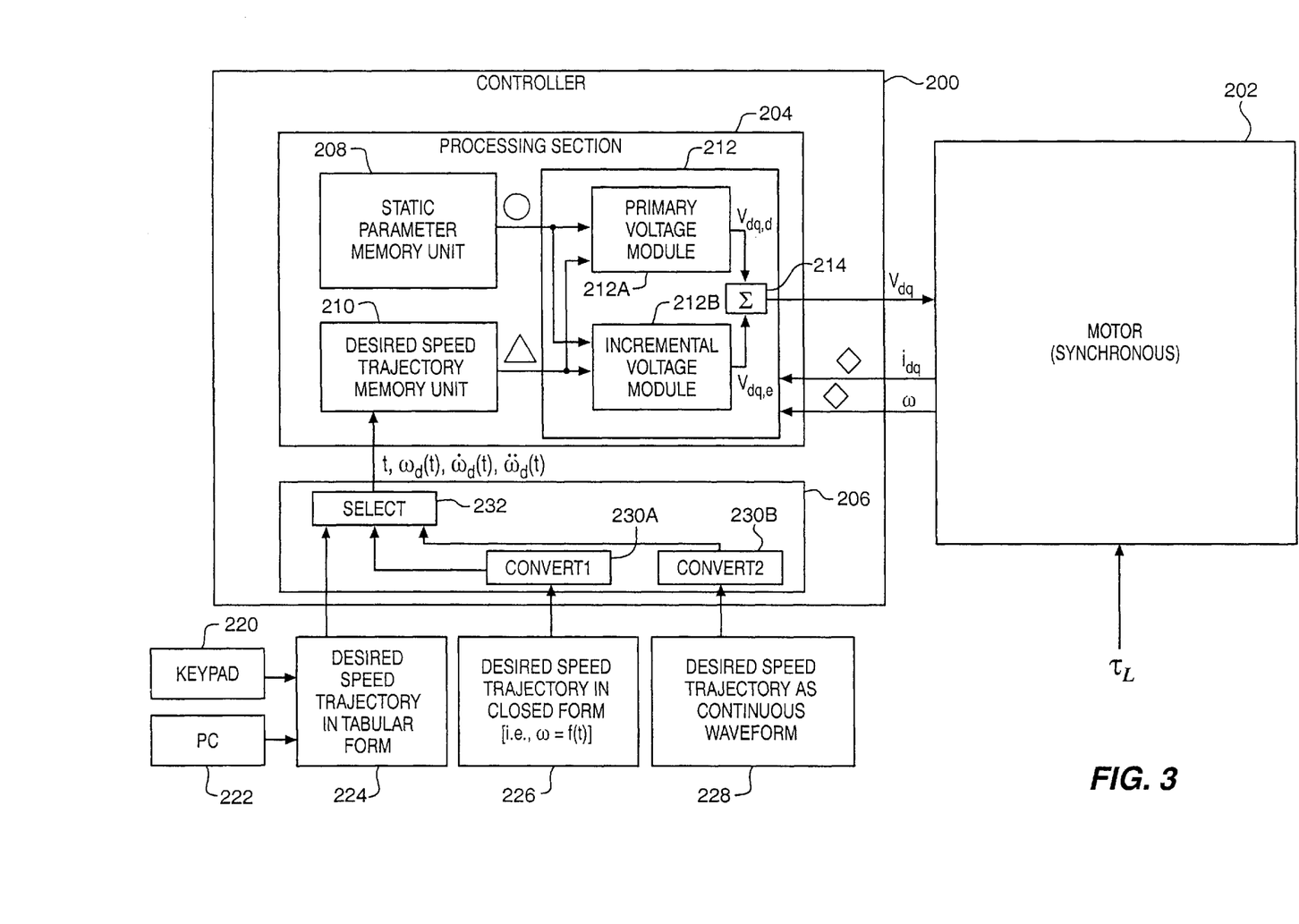
FIG. 3 shows another controller of the invention.

FIG. 3 illustrates a controller 200 constructed according to the invention. The controller 200 operates with a synchronous motor 202. The controller 200 includes a processing section 204 and an input section 206. The processing section includes a static memory parameter unit 208, a desired speed trajectory unit 210, and a two-stage voltage processor 212. The two-stage processor 212 operates to specify a drive voltage $v_{dq}$ to the motor 202; and further acts as a motor sense section to receive motor currents $i_{dq}$ and motor speed $\omega$.

The processor 212 includes a primary voltage module 212a and an incremental voltage module 212b. The primary voltage module 212a operates to compute and specify a primary voltage $v_{dq,d}$; while the incremental voltage module 212b operates to compute and specify a secondary or incremental voltage $v_{dq,e}$. The voltage processor 212 then combines the two voltages at the summation module 214 to specify the drive voltage $v_{dq}$ to the motor 202.

The primary voltage module 212a generally performs the following steps:

calculate a motor torque reference to balance the estimated motor load torque, the reference speed profile, and the filtered incremental friction;

calculate a reference torque at the actual speed;

calculate a reference current to produce the reference torque; and calculate the primary voltage $v_{dq,d}$ as a function of the calculated motor torque and the reference motor currents $i_{dq,d}$ to create a reference current at the actual speed $\omega$.

The incremental voltage module 212b generally calculates a secondary or incremental voltage $v_{dq,e}$ based on incremental resistance and incremental back EMF.

The static parameter memory unit 208 preferably operates to store parameters such as:

H, the moment of inertia of the motor 202

$v, \mu$ and $\sigma$ as constants of the 3×3 matrix of Equation (14), varied such that eigenvalues of the matrix are $-\rho$ B, the rotational friction coefficient P, the number of rotor poles of the motor 202

MI, the permanent magnet coefficient of the motor 202

L, as a matrix of Equation (2.1), where $L_d$ and $L_q$ are inductance coefficients in rotor frame dq coordinates J, as the constant matrix of Equation (1.1)

R, the resistance of the windings of the motor 202

$I_2$, the different order identity matrix $\lambda$, the flux vector $\rho$, the eigenvalue of the 3×3 matrix of Equation (14)

$\kappa$, the parameter in Equation (20)

Those skilled in the art should appreciate that more or fewer parameters can be stored in the unit 208; and that some parameters can be dynamically loaded or changed depending upon processing through the two-stage processor 212.

The desired speed trajectory memory unit 210 preferably operates to store a variable speed profile, over time, for the motor 202. By way of example, the profile can take the form of motor speed $\omega_d(t)$, and/or derivatives thereof. A user can specify the profile through a keypad 220 associated with the controller 200, or through a PC or other system controller 222 (for example, when the motor and controller are integrated into a larger factory system or plant). A user-specified profile generally takes one of three forms: a tabular form stored into a memory table 224, a closed functional form stored into trajectory memory 226, or as a repetitive waveform stored in the waveform module 228, or as a "real time" input. The controller 200 thus preferably includes one or more converters 230a, 230b to convert the user-specified profile into digital form for further processing by the processor 200. A select module 232 can be included to select one of the speed profile forms of 224, 226 and 228. Accordingly, the controller 200 can operate with a variety of situations and is adaptable at user command.

Figure 4A:
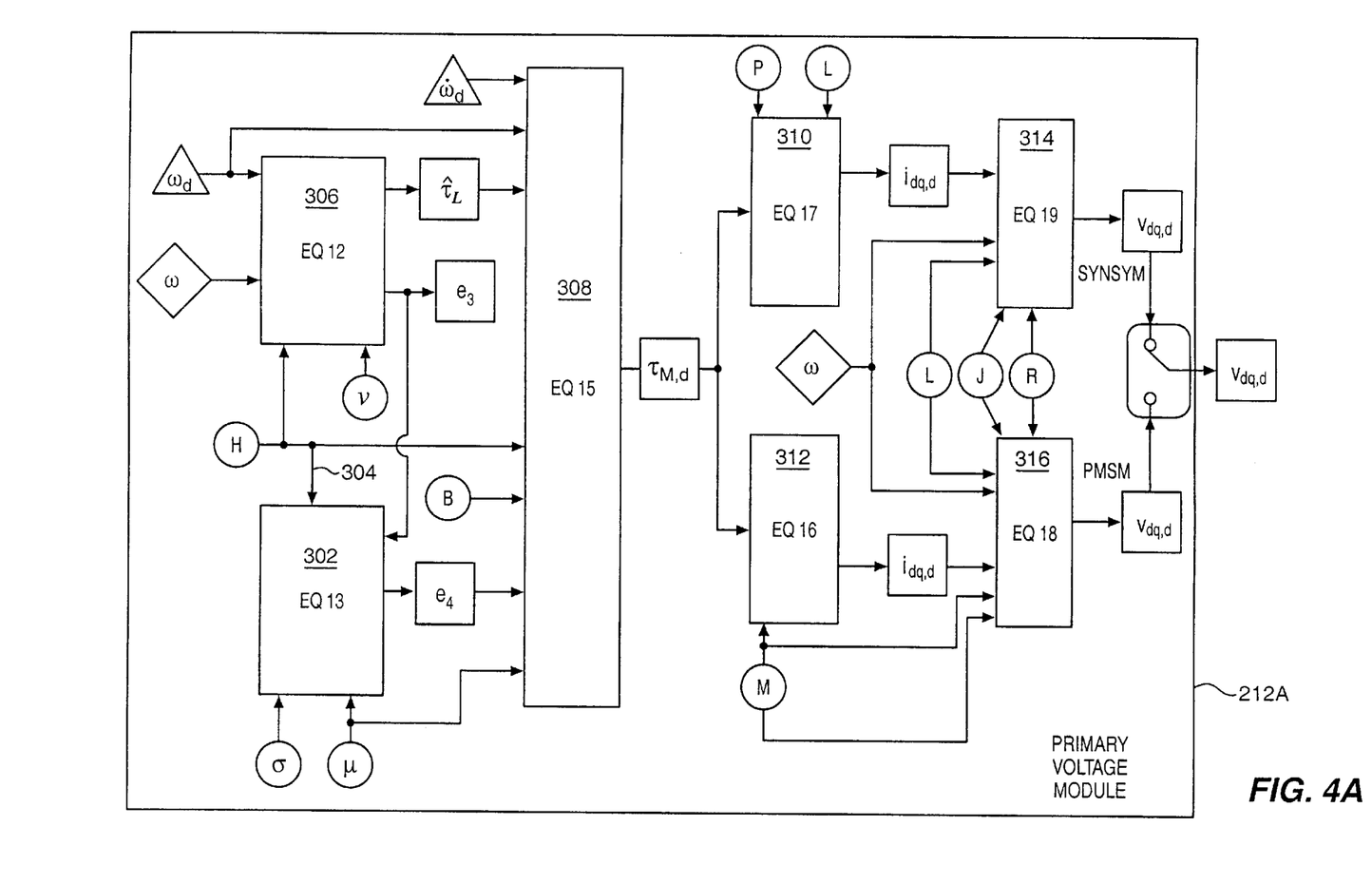
FIG. 4A illustrates a schematic processing flow diagram of the primary voltage generator of the controller of FIG. 3.
Figure 4B:
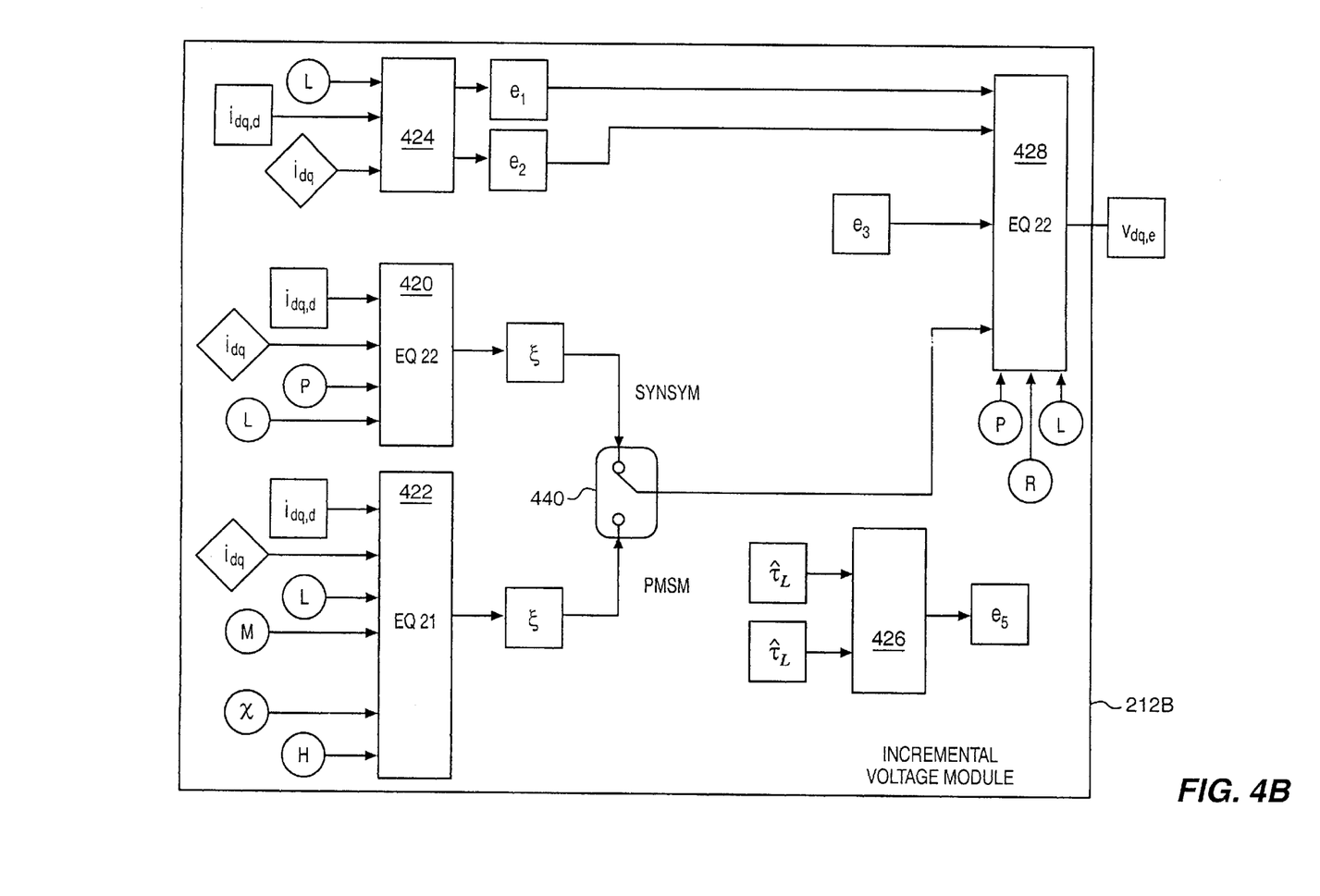
FIG. 4B illustrates a schematic processing flow diagram of the incremental voltage generator of FIG. 3.

FIGS. 4A and 4B illustrate, respectively, further processing flow of the modules 212a and 212b. For purposes of illustration, parameters used in the diagrams of FIGS. 3 and 4 are coded by the following manner:

□ Dynamic parameters

Δ Desired trajectory parameters

◇ Measured parameters

○ Static parameters

The measured parameters can include for example speed $\omega$ and motor current i. Dynamic parameters are those generally calculated in the processing module 212. The desired trajectory parameters generally correspond to the data converted by the input section 206.

More particularly, in FIG. 4A, the process module 302 takes static parameters $\mu, \sigma$, in addition to data signals on signal line 304, and processes through Equation (13) to generate $e_4$. Process module 306 takes other data, such as v, H, motor speed $\omega$ and desired profile $\omega_d$, to generate $e_3$ and estimated load torque by processing through Equation (12). Process module 308 takes input including B, $e_4$, $\omega$, $\omega_d$ and estimated torque (and optionally rotor velocity) to process, $\tau_{M,d}$ by Equation (15).

Process modules 310 and 312 represent optional paths depending upon motor type: process module 310 calculates $i_{dq,d}$ (via Equation 17) for SynSYM, and module 312 calculates $i_{dq,d}$ (via Equation 16) for PMSM. Process modules 314 and 316 follow to process, respectively, Equations (19) and (18), whereby the primary voltage $v_{dq,d}$ is determined as a dynamic parameter.

With respect to FIG. 4B, process modules 420 and 422 process, respectively, Equations (22) and (21) to determine the incremental control $\xi$. A switch 440 is selected depending on the motor type to pass the appropriate control depending on motor type. Those skilled in the art should appreciate that the switch 440 can be programmed into the controller 200 such and toggled by user command. Process module 424 operates to determine incremental quantities $e_1$ and $e_2$; and process module 426 determines $e_5$ by equations set forth in the appendix. Process module 428 takes inputs including the incremental quantity $e_3$, and outputs from process modules 420, 422, 424, to determine the secondary or incremental voltage $v_{dq,e}$.

In addition to the benefits and advantages discussed above, the invention has the following particular advantages over the prior art:

1) Linear controllers of the prior art generally require gain adjustments (a controller parameter) to guarantee global stability of non-linear electric machines and drives. Such adjustments are not required in the controller of the invention, which is non-linear.

2) The controller system of the invention typically requires milder actuation and lower bandwidth, as compared to prior art controller systems (such as a nested loop PI controller), by requiring a slower current response to meet the same overall (mechanical) speed response of the motor. This reduces current overshoot in responses to step commands (that is, the electrical system is not unnecessarily pushed for performance); and further reduces voltage magnitude requirements, thereby reducing the requirements of the DC link capacitor size and quality. Since the controller is not required to impress rapidly varying currents (i.e., those currents with high derivatives, with respect to time), then high voltage magnitudes are also not required.

In addition, the lower bandwidth of the controller of the invention also provides for:

the use of less capable microprocessors (or DSPs) in implementing the algorithms, thereby reducing cost;

the reduction of amplification of sensor noise, and of amplifications of the imperfections inherent in motor design and manufacturing (e.g., due to higher harmonics of in fluxes)—reducing torque and speed ripple;

the reduced excitations of motor imperfections, high frequency parts of the system, and amplified measurement noise; and reduced overall noise.

The controller of the invention also has the added capability to seamlessly provide parameter adaptation, allowing adjustments to changing conditions. Such adaptation includes the ability to compensate for changes in the load (such as inertia variations), changes in motor parameters (e.g., resistance due to heat generation and inductance due to magnetic saturation), and to operate without mechanical sensors. That is, a controller of the invention can operate with a current feedback sensor but without a positional mechanical sensor.

Finally, the controller of the invention provides a development cycle and procedure that has reduced trial and error. For example, in one embodiment, the controller of the invention is a standalone system that calibrates and determines motor parameters that are permanently stored into the motor. Accordingly, such a controller is conveniently used by synchronous motor manufacturers to set the motor parameters (discussed herein) at the factory and to store the parameters into a motor memory so that such a motor operates with reduced processing capability and cost. Such a motor is typically manufactured for a particular speed profile and for known operating conditions; and can be operated with its stored parameters that are calculated at the factory and without subsequent, real time, on-board processing.

The appendix hereto contains, for disclosure purposes, the following articles:
1) Stankovic and Tadmor, *Dissipativity-based Nonlinear Controllers for Synchronous Electric Drives: Description of Invention* (1997).
2) Davidkovich, Stankovic and Tadmor, *Dissipativity Approach to Servo Control of Permanent Magnet Synchronous Motors*, IEEE Transactions on Control Systems Technology (Submitted 1997).
3) Bas, Davidkovich, Stankovic and Tadmor, *A Dissipativity Approach to Adaptation and Control of Permanent Magnet Synchronous Motors*, 6th Conf. on Control Applications, IEEE (1997).
4) Bas, Stankovic and Tadmor, *Passivity Based Sensor-less Control of a Smooth Rotor Permanent Magnet Synchronous Motor*, Conference on Decision and Control, IEEE (1997).

The invention thus attains the objects set forth above, among those apparent from preceding description. Since certain changes may be made in the above apparatus and methods without departing from the scope of the invention, it is intended that all matter contained in the above description or shown in the accompanying drawing be interpreted as illustrative and not in a limiting sense.

It is also to be understood that the following claims are to cover all generic and specific features of the invention described herein, and all statements of the scope of the invention which, as a matter of language, might be said to fall there between.

Having described the invention, what is claimed is:

1. A method of controlling a synchronous motor relative to a reference speed profile, the motor operating at a speed responsive to an applied voltage and having an output with an output current, comprising the steps of:
   (A) calculating a motor torque reference to balance (a) an estimated motor load torque, (b) the reference speed profile, and (c) a filtered incremental friction;
   (B) specifying a reference torque at the operating speed;
   (C) specifying a reference current to produce the reference torque;
   (D) specifying a primary voltage as a function of the calculated motor torque reference and the reference motor current to create a reference current at the operating speed;
   (E) specifying an incremental voltage based on an incremental resistance and an incremental back EMF of the motor;
   (F) summing the primary and incremental voltages to specify the total voltage; and
   (G) providing the total voltage at the motor to drive the motor to the reference speed profile.

2. A method according to claim 1, further comprising the step of inputting the speed profile prior to step A.

3. A method according to claim 1, further comprising the step of sensing the motor current at the output.

4. A method according to claim 1, further comprising sensing an angular position of a shaft of the motor.

5. A method acccording to claim 1, wherein step A comprises the step of determining motor torque in the form of:

$$\tau_{M,d} = H\dot{\omega}_d + B\omega_d + \hat{\tau}_L + \mu e_4$$

where $\mu e_4$ refers to transient, $\hat{\tau}_L$ refers to initial value load torque, $\dot{\omega}_d$ refers to first derivative of desired speed, H refers to moment of inertia, and B refers to rotational friction coefficient.

6. A method according to claim 1, wherein step A comprises the step of determining a permanent magnet synchronous motor current in the form of:

$$i_{dq,d} = \begin{bmatrix} i_{d,d} \\ i_{q,d} \end{bmatrix} = \frac{\tau_{M,d}}{MI}\begin{bmatrix} 0 \\ 1 \end{bmatrix}$$

where $\tau_{M,d}$ is the desired motor torque and MI refers to permanent magnetic flux.

7. A method according to claim 1, wherein step A comprises the step of determining synchronous reluctance motor current in the form of:

$$i_{dq,d} = 2\frac{\sqrt{\tau_{M,d}}}{\sqrt{3P\Delta L}}\begin{bmatrix} 1 \\ 1 \end{bmatrix}$$

where $\tau_{M,d}$ is the desired motor torque, $\Delta L$ is a difference between inductance coefficients, and P is the number of rotor poles.

8. A method according to claim 1, wherein the step of specifying a primary voltage comprises the step of calculating a primary voltage $v_{dq,d}$ to a permanent magnet synchronous motor in the form of:

$$v_{dq,d} = L\frac{d}{dt}i_{dq,d} + (RI_2 + \omega JL)i_{dq,d} + \omega MI\begin{bmatrix} 0 \\ 1 \end{bmatrix}$$

where L is a matrix of inductance coefficients, R refers to winding resistance, J is a constant matrix, MI refers to permanent magnetic flux, $i_{dq,d}$ refers to desired current, $I_2$ is the different order identity matrix, and $\omega$ refers to angular speed.

9. A method according to claim 1, wherein the step of specifying a primary voltage comprises the step of calculating a primary voltage $v_{dq,d}$ to a synchronous reluctance motor in the form of:

$$v_{dq,d} = L\frac{d}{dt}i_{dq,d} + (RI_2 + \omega JL)i_{dq,d}$$

where L is a matrix of inductance coefficients, R refers to resistance, $i_{dq,d}$ refers to desired current, $I_2$ is the identity matrix, J is a constant matrix, and ω refers to angular speed.

10. A method according to claim 1, wherein the step A comprises estimating load torque in the following form:

$$\frac{d}{dt}\hat{\tau}_L = -v^2 e_3$$

where $\tau_L$ refers to initial value load torque, and $e_3$ refers to moment of inertia in the form of $H(\omega-\omega_d)$.

11. A method according to claim 1, wherein the step of specifying an incremental voltage comprises determining an incremental back EMF from the reference current, the operating speed, and the speed profile.

12. A method according to claim 11, further comprising the step of utilizing a back EMF in the form of κξ, where κξ are design parameters.

13. A method according to claim 1, wherein the step of specifying an incremental voltage comprises determining the incremental resistance from the reference current and the output current.

14. A motor controller system for specifying an applied voltage to drive a synchronous motor at a desired speed profile, the motor having an output current and a shaft that rotates at an operating speed in response to the applied voltage, comprising:

a primary voltage module for specifying a primary voltage, the primary voltage module having a first process module for determining an estimated motor load torque, a second process module for determining a filtered incremental friction, a third process module for specifying a reference torque at the operating speed, a fourth process module for specifying a reference current to produce the reference torque, the primary voltage module specifying the primary voltage as a function of the calculated motor torque and the reference motor current to create a reference current at the operating speed, a secondary voltage module for specifying an incremental voltage based on an incremental resistance and an incremental back EMF of the motor; and means for summing the primary and incremental voltages to specify the applied voltage.

15. A motor controller system of claim 14, further comprising a synchronous electric drive responsive to the applied voltage to track the speed profile.

16. A motor controller system according to claim 14, further comprising means for switching between process modules corresponding to a permanent magnet synchronous motor or alternatively a synchronous reluctance motor, wherein the applied voltage derives from calculations associated from either the permanent magnet synchronous motor or the synchronous reluctance motor.

17. A motor controller system of claim 14, wherein the secondary voltage module comprises means for determining the incremental resistance from the reference current and the output current.

* * * * *